(12) United States Patent
Brown et al.

(10) Patent No.: US 7,155,515 B1
(45) Date of Patent: Dec. 26, 2006

(54) DISTRIBUTED LOAD BALANCING FOR SINGLE ENTRY-POINT SYSTEMS

(75) Inventors: Justin D. Brown, Seattle, WA (US);
John W. Smith, Seattle, WA (US);
Craig A. Link, Seattle, WA (US);
Hoon Im, Sunnyvale, CA (US);
Charles H. Barry, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 903 days.

(21) Appl. No.: 09/778,223

(22) Filed: Feb. 6, 2001

(51) Int. Cl.
*G06F 15/173* (2006.01)
*G06F 15/16* (2006.01)

(52) U.S. Cl. .................. 709/226; 709/203; 709/227

(58) Field of Classification Search ............... 709/226, 709/227, 203; 718/105
See application file for complete search history.

(56) References Cited

U.S. PATENT DOCUMENTS

| | | | | |
|---|---|---|---|---|
| 5,031,089 A | * | 7/1991 | Liu et al. | ............... 709/226 |
| 6,128,279 A | * | 10/2000 | O'Neil et al. | ............... 370/229 |
| 6,438,652 B1 | * | 8/2002 | Jordan et al. | ............... 711/120 |

OTHER PUBLICATIONS

Microsoft Windows 2000 Server—Network Load Balancing Technical Overview—White Paper, Mar. 16, 2000, Published online at http://www.microsoft.com/windows2000/library/howitworks/cluster/nlb.asp, pp. 1-29.

* cited by examiner

*Primary Examiner*—Jason Cardone
*Assistant Examiner*—Tanim Hossain
(74) *Attorney, Agent, or Firm*—Ronald M. Anderson

(57) ABSTRACT

A method and system for distributing work load in a cluster of at least two service resources. Depending upon the configuration, a service resource may be an individual process, such as a single instance of a computer game, or a node on which multiple processes are executing, such as a Server. Initial connection requests from new clients are directed to a single entry-point service resource in the cluster, called an intake. A separate intake is designated for each type of service provided by the cluster. The clients are processed in a group at the service resource currently designated as the intake to which clients initially connected, for the duration of the session. Based upon its loading, the current intake service resource determines that another service resource in the cluster should become a new intake for subsequent connection requests received from new clients. Selection of another service resource to become the new intake is based on the current work load of each resource in the cluster. All resources in the cluster are periodically informed of the resource for each service being provided that was last designated as the intake, and of the current load on each resource in the cluster. Subsequently, new clients requesting a service are directed to the newly designated intake for that service and processed on that resource for the duration of the session by those clients.

36 Claims, 6 Drawing Sheets

DISTRIBUTED LOAD BALANCING FOR SINGLE ENTRY-POINT SYSTEMS

FIELD OF THE INVENTION

The present invention generally relates to a method and system for balancing resource utilization in a cluster of resources, and more specifically, to assigning related service requests to a specific resource to efficiently process the service requests.

BACKGROUND OF THE INVENTION

The term "load balancing" as used in connection with a computer network is a method of dividing work between two or more computational resources so that more work is completed in less time. In general, all clients of a service or services performed by such resources are served more quickly when the computational load is balanced among multiple resources. Typically, a cluster of resources is formed when balancing a computational load. For example, companies whose Web sites receive a great deal of traffic usually use clusters of Web server computers for load balancing.

Load balancing among a cluster of resource nodes is typically done by distributing service requests and service processing throughout the cluster of resources, without any regard for grouping. The goal is to share the processing task among the available resource nodes. Doing so minimizes turn-around time and maximizes resource utilization. In most cases, the particular resource that accepts and processes a service request is irrelevant to a requesting client or to the resources that carry out a service request. For example, it is generally irrelevant which Web server, in a cluster of Web servers, processes a request by a client for a current stock quote.

There are several important considerations in implementing load-balanced systems, including routing of tasks, fault tolerance, node priority, and load distribution. At a system level, controlling the overall load-balancing function involves tasks such as: (1) determining how client requests should be communicated throughout a cluster of resources (i.e., routing); (2) determining the status of resources within a cluster; (3) determining how a load will be handled if one of the resource nodes that was handling that load fails (i.e., fault tolerance); and (4) determining how the cluster will be reconfigured to share the processing load when the number of available resource nodes changes.

At a performance level, it is important to determine when and how a load will be distributed within a cluster. This decision is typically defined in accord with a load distribution algorithm. Typical algorithms of this type include: (1) round robin, (2) weighted round robin, (3) least connections, and (4) statistical mapping. In some load-balancing systems, a centralized control implements the algorithm and effects the load balancing among resources as defined by the algorithm. For example, if two Web servers are available to handle a work load, a third server may determine the Web server that will handle the work (i.e., control routing of service tasks).

This function is often the case with Domain Name System (DNS) load-balancing systems, such as Cisco System, Inc.'s DistributedDirector™. A client simply issues a request to connect to a domain name site, such as www.microsoft.com. This request is routed to a DNS server, which selects the appropriate Web server address. The manner in which the DNS server selects a Web server address is determined by a specific load-distribution algorithm implemented in the DNS server. Once determined, the Web server address is returned to the client, which then initiates a connection request to the Web server address. Thus, the DNS server is the central controller of the load-balancing system that directs traffic throughout the cluster.

To avoid redirecting the client and requiring a second connection request, some hardware load balancers use a centralized technique called Network Address Translation (NAT). NAT is often included as part of a hardware router used in a corporate firewall. NAT typically provides for the translation of an Internet Protocol (IP) address used within one network known as the "outside network" (such as the Internet) to a different IP address employed within another network known as the "inside network" (such as a local area network comprising a cluster of resources). As with a DNS server, NAT devices typically have a variety of load-balancing algorithms available to accomplish dynamic mapping, including round robin, weighted round robin, and least connections.

NAT can also be used in conjunction with policy routing. Policy routing is a routing technique that enables network administrators to distribute traffic among multiple paths based on the traffic characteristics. Instead of simply routing based upon the destination address, policy-based routing enables network administrators to determine and implement routing policies to allow or deny paths in accord with parameters such as the identity of a particular end system, the application requested, the protocol used, and the size of data packets.

Another approach to balance client requests employs a content-smart switch. Like NAT devices, content-smart switches are typically a form of router inserted between clients and Web servers. These switches typically use tags from a client's HTTP request, or use information from cookies stored on the client to determine the Web server to which the client request will be relayed. For example, if a client request tag or cookie identifies the client as a "premium" customer, then the switch will route the client to a Web server that is reserved for premium customers. However, if a cluster of Web servers are reserved for premium clients, then other techniques must still be used to balance the load of premium clients among the cluster of reserved Web servers.

Central load-balancing control is easy to implement and maintain, but is not inherently fault-tolerant and usually requires backup components. In each example above, a backup DNS server, NAT device, and content-smart switch would be required for each corresponding cluster to continue operating if the primary controller failed. Conversely, distributed load-balancing control provides redundancy for fault tolerance, but it requires coordination between the resources in a cluster. Each resource must be aware of the load on the other resources and/or on the cluster as a whole to be capable of managing the load, if necessary.

Distributed load-balancing control can be implemented in hardware, but usually still requires backup components. In contrast, software load-balancing systems can be distributed among each node in the cluster. Although each node must use some of its resources to coordinate the load-balancing function, distributed software load balancing eliminates the cost of, and reliance on, intermediary hardware. Alternatively, distributed software load balancing among each node can be used in addition to intermediary routers/balancers.

Popular software load-balancing systems include Microsoft Corporation's WINDOWS NT™ Load Balancing Service (WLBS) for WINDOWS NT™ Server Enterprise Edition, and the corresponding upgrade version, called Network Load Balancing (NLB), which is a clustering technology included in the WINDOWS™ 2000 Advanced Server and Datacenter Server operating systems. Both use a fully distributed software architecture. For example, an identical copy of the NLB driver runs on each cluster node. At each cluster node, the driver acts as a filter between the node's network adapter driver and its Transmission Control Protocol/Internet Protocol (TCP/IP) stack. A broadcast subnet delivers all incoming client network traffic to each cluster node, which eliminates the need to route incoming packets to individual cluster nodes. The NLB driver on each node allows a portion of the incoming client network traffic to be received by the node. A load-distribution algorithm on each node determines which incoming client packets to accept. This filtering of unwanted packets is faster than routing packets (which involves receiving, examining, rewriting, and resending). Thus, NLB typically delivers higher network throughput than central control solutions.

In conjunction with control of the load-balancing function, load-distribution algorithms determine the distribution of loads throughout a cluster. Unsophisticated algorithms may do nothing more than distribute load by sequentially routing incoming client requests to each successive resource node (i.e., a round robin technique). More generally, a round robin algorithm is a centralized method of selecting among elements in a group in some rational order, usually from the top of a list to the bottom of the list, and then starting again at the top of the list. Another application of the round robin technique is in computer microprocessor operation, wherein different programs take turns using the resources of the computer. In this case, execution of each program is limited to a short time period, then suspended to give another program a turn (or "time-slice"). This approach is referred to as round robin process scheduling.

By extension to Internet server farms, a Round Robin Domain Name System (RRDNS) enables a limited form of TCP/IP load balancing. As suggested by the above description of the DNS server model, RRDNS uses DNS to map incoming IP requests to a defined set of servers in a round robin fashion. Thus, the load balancing is accomplished by appropriate routing of the incoming requests.

Other algorithms for implementing load balancing by distributed routing of incoming requests include weighted round robin, least connections, and random assignment. As the name suggests, weighted round robin simply applies a weighting factor to each node in the list, so that nodes with higher weighting factors have more requests routed to them. Alternatively, the cluster may keep track of the node having the least number of connections to it and route incoming client requests to that node. The random (or statistical) assignment method distributes the requests randomly throughout the cluster. If each node has an equal chance of being randomly assigned an incoming client request, then the statistical distribution will tend to equalize as the number of client requests increases. This technique is useful for clusters that must process a large number of client requests. For example, NLB uses a statistical distribution algorithm to equalize Web server clusters.

Some of the above-noted algorithms may be enhanced by making distribution decisions based on a variety of parameters, including availability of specific nodes, node capacity for doing a specific type of task, node processor utilization, and other performance criteria. However, each of the above-described systems and algorithms considers each client request equally, independent from other client requests. This manner of handling independent requests, and the nodes that service them, is referred to as "stateless." Stateless resource nodes do not keep track of information related to client requests, because there is no ongoing session between the client and the cluster. For example, an individual Web server, in a cluster of Web servers that provide static Web pages, does not keep track of each client making a request so that the same client can be routed again to that particular Web server to service subsequent requests.

However, it is not uncommon for clusters to provide some interactive service to clients and retain information related to a client request throughout a client session. For example, many clusters servicing E-commerce maintain shopping cart contents and Secure Socket Layer (SSL) authentication during a client session. These applications require "stateful nodes," because the cluster must keep track of a client's session state. Stateful nodes typically update a database when serving a client request. When multiple stateful nodes are used, they must coordinate updates to avoid conflicts and keep shared data consistent.

Directing clients to the same node can be accomplished with client affinity parameters. For example, all TCP connections from one client IP address can be directed to the same cluster node. Alternatively, a client affinity setting can direct all client requests within a specific address range to a single cluster node. However, such affinities offset the balance of the load in a cluster. In an attempt to maintain as much load balance of client requests as possible while maintaining stateful client sessions on a node, often, a first-tier cluster of stateless nodes are used to balance new incoming client requests, and a second-tier cluster of stateful nodes are used to balance the ongoing client sessions. Also, a third-tier cluster is often used for secure communication with databases. For example, E-commerce Web sites typically use NLB as a first-tier load-balancing system, in conjunction with Component Object Module Plus (COM+) on the second tier, and Microsoft™ Cluster Service (MSCS) on the third tier.

However, the above systems still consider each client request independent from the requests of all other clients. In some cases, there is a need to group certain requests and concomitant processing services, and maintain the group during the processing, even though the requests originate from different clients. For example, in online multi-player computer games, such as Hearts, it is beneficial to direct a number of client game players to a common node and process the game service requested by those clients on that node throughout the entire play of the game. Doing so increases the speed and likelihood of matching interested client players together in a game and maintains continuity of game play. If players are not directed to a common node, one or two players will be left waiting to play at several different nodes when these individuals could already be involved in playing the game if they had been directed to a single node. Also, keeping a group of players together on a single resource or node eliminates delays that would be caused if the processing of the game service for those players is shared between different nodes in the cluster.

Although the need to group players on a single resource is important, it remains desirable to balance the overall processing load represented by all groups of players and various game services (or other processing tasks) being implemented by a cluster among the nodes of the cluster to most efficiently utilize the available processing resources. It is also desirable to be able to scale the load and tolerate faults by dynamic changes to the number of resources in the cluster. Microsoft™ Corporation's Gaming Zone represents a cluster of nodes in which multiple players must be allocated in groups that achieve such a desired balance between different available processing nodes. Previous load-balancing hardware and software techniques have not provided for grouping client requests for a related task on a specific resource node. Accordingly, a technique was required that would both group such related tasks and still balance the overall processing load among all available resource nodes on a cluster.

SUMMARY OF THE INVENTION

The present invention satisfies the need to group and retain clients on a common resource so long as the processing service they require is provided, while distributing the processing load among resources to achieve efficient utilization of the resources in a cluster. In the present invention, a hybrid of stateless and stateful load balancing is employed, using distributed software for decentralized control, and an integrated distribution algorithm for determining the resource that will process client requests. For relatively light traffic, the present invention eliminates the need for multi-tier load-balancing systems, and for high traffic, reduces the number of first-tier stateless nodes required by doing preliminary load balancing on new incoming client requests.

More specifically, the present invention is directed to a method and system for distributing a processing load among a plurality of service resources in a cluster. A cluster may be either a single node implementing multiple instances of a service resource, or multiple nodes, wherein each node can implement multiple instances of different service resource types. Similarly, a service resource may comprise an individual process, such as a single instance of a computer game, or may comprise an entire node that is executing multiple processes, such as a Server. Thus, as used in the claims that follow, the terms "cluster," "node," and "resource" are defined in relative terms, but are not limited to a specific hardware or other fixed configuration. As used herein, a cluster includes a plurality of service resources, and the plurality of service resources may be executed on one or more nodes.

The method directs initial connection requests from clients to a single entry-point service resource in the cluster, called an intake. A separate intake is designated for each different type of service that is being provided by the cluster. One or more instances of each type of service are processed by one or more nodes in the cluster. Clients are grouped together and processed in a group at a service resource for as long as the service is provided by the resource. As used herein, a client may be a single client device, such as a personal computer. However, the term client is not intended to be limiting. For example, a client may also be an instance of a function, such as a browser. Thus, multiple instances of a function may run on a single computer, and each instance can be considered an individual client. This may be the case where multiple instances of a browser are run on one personal computer to play a game in multiple groups, or different games, concurrently.

As a function of loading, a first service resource that was designated as the intake determines that another service resource in the cluster should become a new intake for subsequent connection requests from clients. The other service resource is then designated as the new intake. New client requests for the service are then directed to the new intake to form a second group of clients. The second group of clients will continue to receive services from the second service resource for as long as the service is provided.

Designating a service resource as the intake is preferably done by calculating a rating value for each service resource in the cluster, and then selecting the service resource to be the new intake as a function of the rating value. The selected service resource broadcasts a message to the rest of the resources in the cluster, informing the other resources of its identity as the new intake. Any service resource that later receives a request for service from a new client will then direct the new client to the new intake for that service. The client may simply be given a network address to the new intake and required to initiate a connection to the new intake. Alternatively, the client's connection request may be forwarded directly to the new intake.

To distribute the work load throughout the cluster, the service resource that is designated as the current intake first evaluates its own operating conditions to calculate a load value. If the load value exceeds a predetermined threshold, then the intake selects another service resource to be designated as the new intake. The selection is preferably made based on the load value described above. After selecting a new service resource, the current intake service resource broadcasts a message to all other service resources identifying the new intake. The newly designated intake recognizes its new function and accepts connection requests from new clients.

As a fault tolerance measure, a service resource will assume the designation as the new intake if that service resource has not received a status message from the current intake within a predetermined period of time. If more than one service resource assumes the designation as the new intake, then the service resource that will be designated as the new intake is based upon a numerical identifier associated with each of the service resources.

Another aspect of the present invention is directed to a machine-readable medium on which are stored machine-executable instructions that, when executed by a processor, cause the processor to perform functions that are generally consistent with the steps of the method described above. A machine readable medium may store machine instructions executed by the cluster of resources, or machine instructions executed by the clients, or both.

Yet another aspect of the present invention is directed to a system for distributing work load in a cluster. The system comprises at least one processor for implementing the cluster. Although multiple processors may be more commonly used for a cluster, the system can be implemented and used to balance the load among a plurality of resources (e.g., software objects) executed by a single processor, or by multiple processors, to provide services to a plurality of clients. The system further comprises an interface coupling the processor(s) to the clients. A plurality of service resources are operatively connected to each other and to the clients. Each resource is capable of being designated as an intake that accepts new client requests for a specific service, forming a group of clients that will continue to receive services from the service resource for as long as the services are provided. Machine instructions are stored in a memory that is accessible by the one or more processors. The machine instructions cause the one or more processors to implement functions generally consistent with the steps of the method discussed above.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Exemplary Operating Environment

Figure 1:
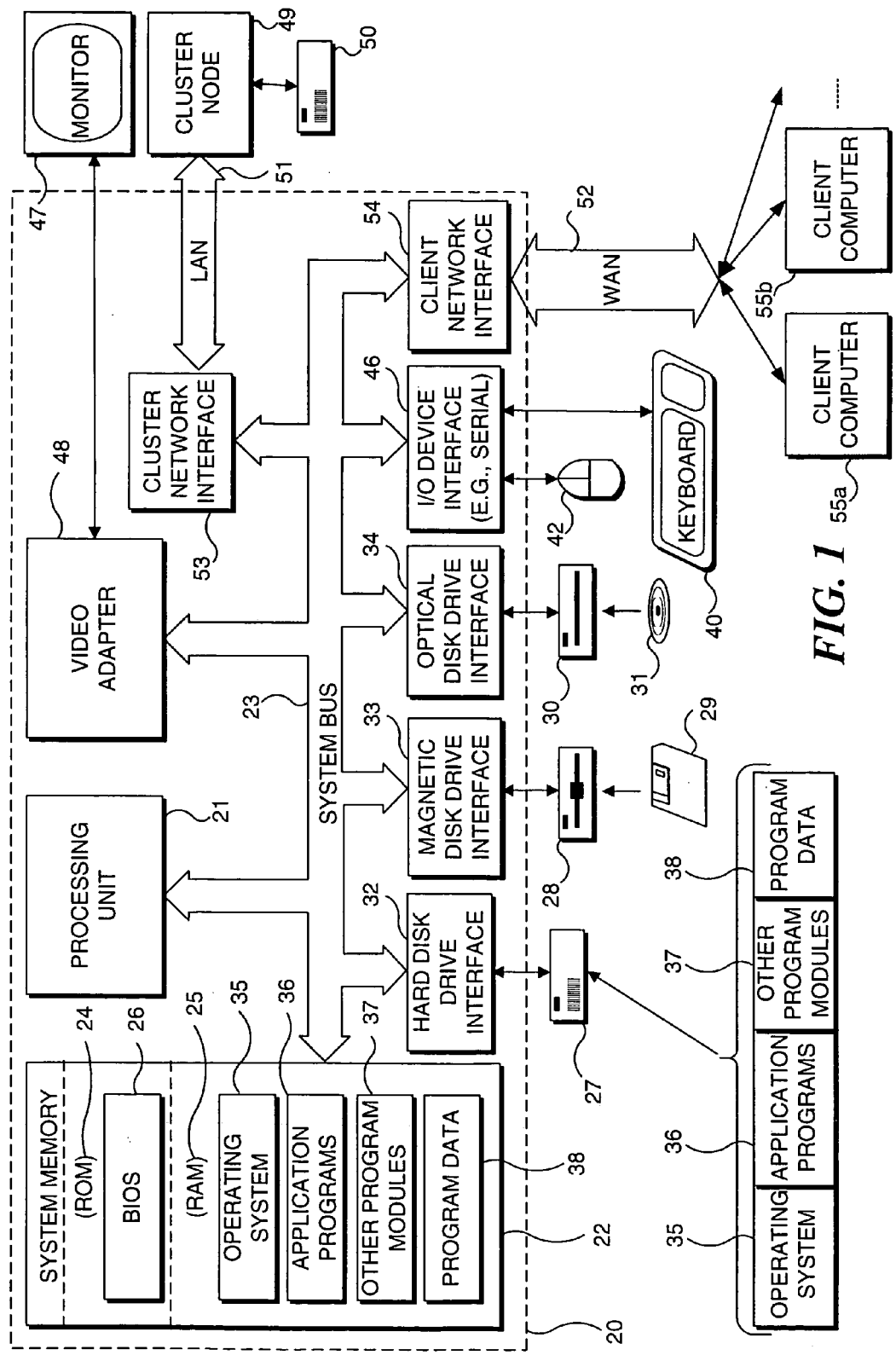
FIG. 1 is a schematic block diagram of an exemplary Server (PC) system suitable for implementing the present invention.

FIG. 1 and the following discussion are intended to provide a brief, general description of a suitable computing environment in which the present invention may be implemented, preferably in regard to a server that stores and provides Web pages and a client that requests the Web pages and displays them to a user. Although not required, the present invention will be described in the general context of computer-executable instructions, such as program modules that are executed by a computer configured as a Server, and by client computing devices, such as personal computers. Generally, program modules include routines, programs, objects, components, data structures, etc. that perform particular tasks or implement particular abstract data types. Also, those skilled in the art will appreciate that the present invention may be practiced to balance requests from other client computing devices, including hand-held devices, pocket personal computing devices, digital cell phones adapted to connect to a network, microprocessor-based or programmable consumer electronic devices, game consoles, TV set-top boxes, multiprocessor systems, network personal computers, minicomputers, mainframe computers, industrial control equipment, automotive equipment, aerospace equipment, and the like. The invention may be practiced in a single device with one or more processors that process multiple tasks, but preferably will be practiced in distributed computing environments where tasks are performed by separate processing devices that are linked by a communications network. In a distributed computing environment, program modules may be located in both local and remote memory storage devices.

With reference to FIG. 1, an exemplary system for implementing the present invention includes a general purpose computing device in the form of a conventional Server 20, provided with a processing unit 21, a system memory 22, and a system bus 23. The system bus couples various system components, including the system memory, to processing unit 21 and may be any of several types of bus structures, including a memory bus or memory controller, a peripheral bus, and a local bus using any of a variety of known bus architectures. The system memory includes read-only memory (ROM) 24 and random access memory (RAM) 25. A basic input/output system (BIOS) 26, containing the basic routines that are employed when transferring information between elements within Server 20 and during start up, is stored in ROM 24. Server 20 further includes a hard disk drive 27 for reading from and writing to a hard disk (not shown), a magnetic disk drive 28 for reading from or writing to a removable magnetic disk 29, and an optical disk drive 30 for reading from or writing to a removable optical disk 31, such as a CD-ROM or other optical media. Hard disk drive 27, magnetic disk drive 28, and optical disk drive 30 are connected to system bus 23 by a hard disk drive interface 32, a magnetic disk drive interface 33, and an optical disk drive interface 34, respectively. The drives and their associated computer-readable media provide nonvolatile storage of computer-readable machine instructions, data structures, program modules, and other data for Server 20. Although the exemplary environment described herein employs a hard disk, removable magnetic disk 29, and removable optical disk 31, it will be appreciated by those skilled in the art that other types of computer-readable media, which can store data that is accessible by a computer, such as magnetic cassettes, flash memory cards, digital video disks, Bernoulli cartridges, random access memories (RAMs), read-only memories (ROMs), and the like, may also be used in the exemplary operating environment.

A number of program modules may be stored on the hard disk, magnetic disk 29, optical disk 31, ROM 24, or RAM 25, including an operating system 35, one or more application programs 36 (such as a browser program), other program modules 37, and program data 38. An operator may enter commands and information into Server 20 through input devices such as a keyboard 40 and a pointing device 42. Other input devices (not shown) may include a microphone, joystick, game pad, satellite dish, scanner, digital camera, or the like. These and other input devices are often connected to processing unit 21 through an input/output (I/O) device interface 46 that is coupled to the system bus. Output devices, such as a printer (not shown), may also be connected to processing unit 21 through an I/O device interface 46 that is coupled to the system bus. Similarly, a monitor 47 or other type of display device is also connected to system bus 23 via an appropriate interface, such as a video adapter 48, and is usable to display Web pages and/or other information. In addition to the monitor, Servers may be coupled to other peripheral output devices (not shown), such as speakers (through a sound card or other audio interface—not shown).

Server 20 preferably operates in a networked environment using logical connections to one or more additional computing devices, such as to a cluster node 49 that is yet another server in a cluster of servers. Cluster node 49 is alternatively a database server, a mainframe computer, or some other network node capable of participating in cluster processing, and typically includes many or all of the elements described above in connection with Server 20, although only an external memory storage device 50 has been illustrated in FIG. 1. The logical connections depicted in FIG. 1 include a local area network (LAN) 51 and a wide area network (WAN) 52. Such networking environments are common in offices, enterprise-wide computer networks, and intranets. Preferably, LAN 51 is a back-end subnet connecting a plurality of resource nodes of the cluster in communication with each other. Preferably, WAN 52 is the Internet, which connects the cluster in communication with a plurality of client computers 55a, 55b, etc.

Those skilled in the art will recognize that LAN 51 and WAN 52 can be the same network with both resource nodes and client computers connected via only a single network. Client computers 55a, 55b, etc. each preferably include many of the elements described above in connection with Server 20. However, as indicated above, client computers 55a, 55b, etc. may be a combination of hand-held devices, pocket personal computing devices, digital cell phones, and other types of client computing devices.

Server 20 is connected to LAN 51 through a cluster network interface or adapter 53, and to WAN 52 though a client network interface or adapter 54. Client network interface 54 may be a router, modem, or other well-known device for establishing communications over WAN 52 (i.e., over the Internet). Those skilled in the art will recognize that cluster network interface 53 and client network interface 54 may be internal or external, and may be the same, or even a single interface device. Cluster network interface 53 and client network interface 54 are connected to system bus 23, or may be coupled to the bus via I/O device interface 46, e.g., through a serial or other communications port.

In a networked environment, program modules depicted relative to Server 20, or portions thereof, may be stored in the remote memory storage device. It will be appreciated that the network connections shown are exemplary and other techniques for establishing a communications link between the computers may be used, such as wireless communications.

Exemplary Implementation of the Present Invention

Figure 2:
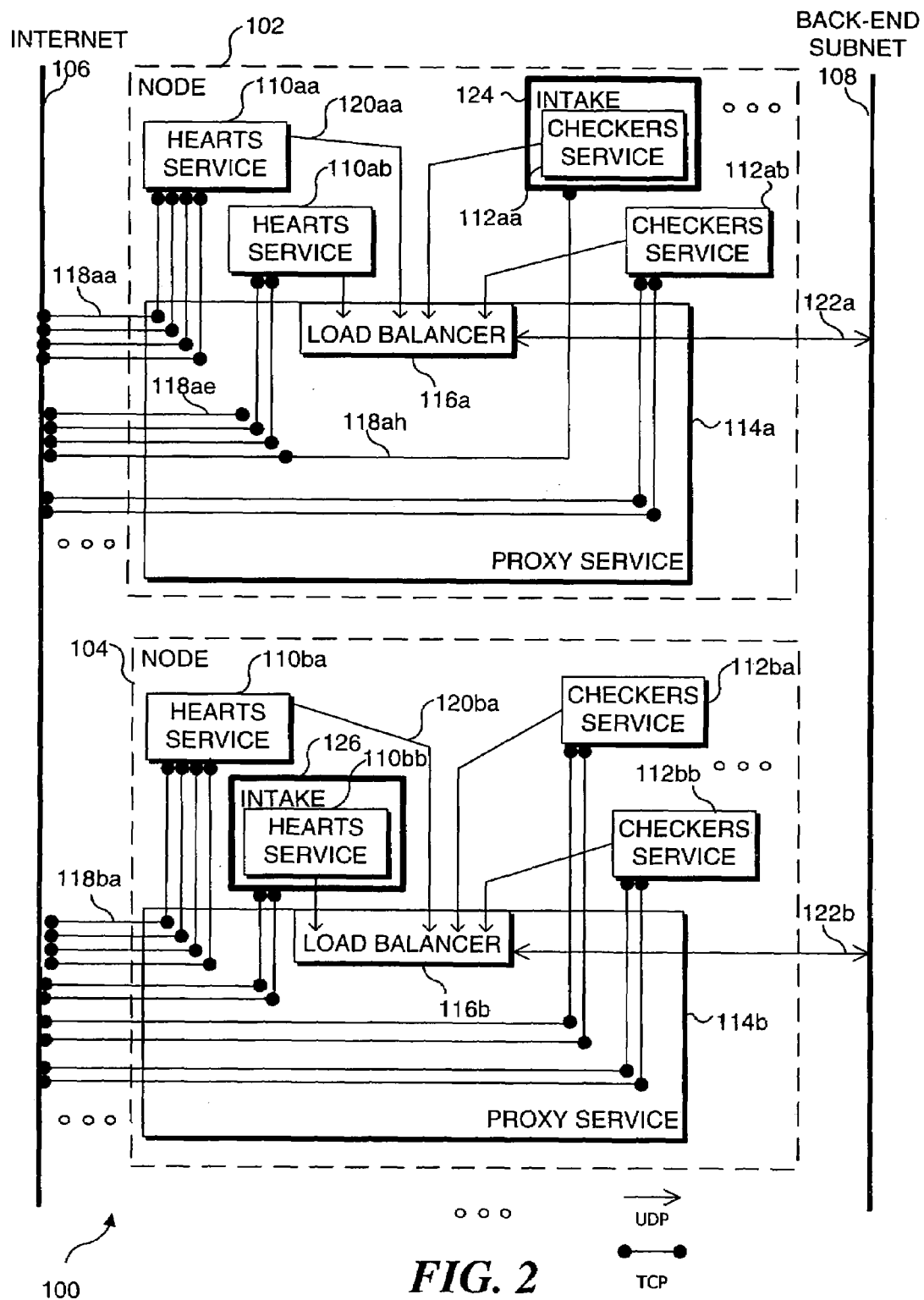
FIG. 2 illustrates the architecture of a preferred embodiment of the present invention in which a cluster of Servers host online game services.

The following describes exemplary implementations of several preferred embodiments. FIG. 2 illustrates the architecture of one preferred embodiment of the invention wherein a cluster of Servers host online game services.

Cluster 100 generally comprises multiple nodes, such as node 102 and node 104. Each node is operatively connected in communication with clients via a wide area network, such as the Internet 106, and operatively connected to a local area network, such as back-end subnet 108. Each node can host multiple types of online game such as Hearts, Checkers, Spades, Backgammon, and Reversi.

Each type of game will typically be implemented in multiple instances on the game service. For example, Hearts has multiple instances identified as Hearts game services 110aa, 110ab, etc. Similarly, Checkers has multiple instances implemented as Checkers game services 112aa, 112ab, etc. Each game service thus supports multiple instances of the game for that game service. For example, Hearts game service 110aa might support two hundred games of Hearts, each match including four players. However, to simplify FIG. 2, each game service is illustrated as representing only one match. Also, each type of game may not have equivalent numbers of game service instances. Some nodes may not provide services for a particular type of game at all. The number of game service instances on a node for a particular type of game typically is indicative of the number of clients requesting that game. For illustrative purposes, node 104 has Hearts game services 110ba and 110bb, as well as Checkers game services 112ba and 112bb, reflecting that a sufficient number of clients requested Hearts and Checkers to warrant multiple instances of each game service.

To manage client communications with the game services, each node in the cluster implements its own proxy service, as illustrated by proxy services 114a and 114b, and the proxy services for the nodes are all identical in functionality. Each proxy service also accesses a dynamic link library (DLL) that comprises a load balancer as illustrated by dynamic link libraries 116a and 116b.

A single instance of the proxy service and load balancer could control communication and load balancing for the entire cluster if all client and game service communications were routed to the single proxy service and load balancer, respectively. Such an approach would provide a centralized control embodiment of the present inventions. Preferably, however, a proxy service and a load balancer run on each node to provide fault-tolerant distributed control. Each proxy service manages TCP connections to Internet 106. Multiple TCP connections 118aa, 118ae, 118ah, 118ba, etc. are thus illustrated. These TCP connections enable communication between client devices (not shown) and the various instances of the game services.

The proxy service on each node maintains connections with some clients for a short time, although those clients may not currently be communicating with a game service. For example, TCP connection 118ae represents a client connection in which the client dropped out of Hearts game service 110ab, but wanted to be matched with a new set of players for another game. The remaining players may continue playing if the game service involved supports artificial intelligence, so that the game service provides a "computer player" as a replacement. After dropping out of Hearts game service 110ab, the player at TCP connection 118ae continues to communicate with proxy service 114a to find out which node has a new Hearts game service that the player can join, and proxy service 114a will direct the player to Hearts game service 110bb for a new match. Similarly, the player on TCP connection 118ah dropped out of Hearts game service 110ab, but reconnected to Checkers game service 112aa.

The game services maintain User Datagram Protocol (UDP) communication with load balancer 116. UDP connections 120aa, 120ba, etc. convey various status messages from each game service to the corresponding node's load balancer. Each load balancer 116 maintains UDP connections 122a, 122b, etc., using back end subnet 108.

One game service instance of each type of game is designated as an "intake" for the cluster. The intake for a specific type of game serves as a central point for new client requests and groups, or matches, clients into a game. For example, Checkers game service 112aa is designated as the Checkers intake 124 for the Checkers game type. Similarly, Hearts game service 110bb is designated as the Hearts intake 126 for the Hearts game type. Any game service instance can be designated the intake for that game type regardless of which node within the cluster is executing the designated game service instance. However, only one game service instance can be designated as the intake for each type of game. A game service instance that is designated as the intake for a game type is responsible for accepting new client requests to participate in that type of game.

Figure 3:
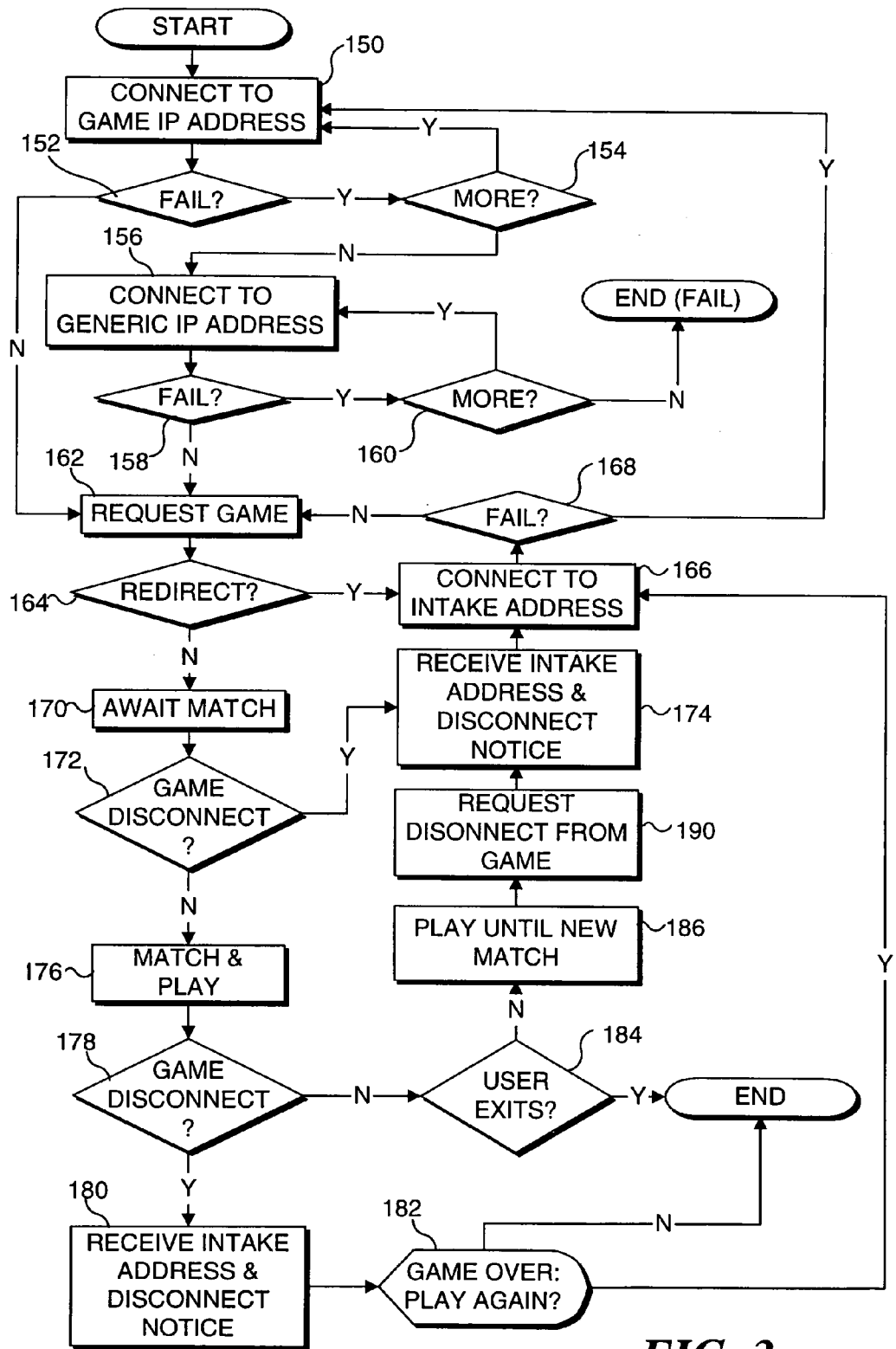
FIG. 3 illustrates the logic of one preferred embodiment for a client device that is connecting to the intake for a specific game type in the cluster of FIG. 2.

FIG. 3 illustrates the logic of a preferred embodiment that facilitates the connection of a client device to the intake of a type of game provided on a cluster like that described above. Although the present invention does not require the client device to have any special capabilities or to store communication addresses to games hosted by the cluster, one preferred embodiment incorporates additional capabilities and provides addresses accessed by the operating systems of the client devices to automate connecting to and communicating with the cluster. For example, the Microsoft WINDOWS™ Millennium Edition Operating System includes a list of DNS names and associated IP addresses of cluster nodes in Microsoft Corporation's MSN GAME ZONE™, which are configured to run the game types discussed above. Thus, when a user selects a type of game on the client device that the user wants to play online, the operating system picks the corresponding DNS name and an associated IP address to initiate communication with the cluster so that the user can play the selected game.

As illustrated by a step 150, the client device attempts to connect to the selected game IP address in the cluster. At a decision step 152, the client device determines whether the connection attempt has failed. If so, then the client device determines at a decision step 154 whether additional IP addresses that correspond to other nodes in the cluster for the selected game type are stored on the client device. If an additional IP address is available for the selected game type, the client device returns to step 150 to attempt to connect to the new IP address. If no additional IP addresses are available for the selected game type, then the client device retrieves a generic IP address for the cluster from its list of DNS names. A generic IP address is registered to the general DNS name of the cluster, which has all nodes in the cluster registered to it. Thus, even if only one node in the cluster remains functional, the client will eventually find it. The client then attempts to connect to the generic IP address at a step 156. At a decision step 158 a client device determines whether this connection has failed. If so, the client device determines at a decision step 160 whether any additional generic IP addresses to the cluster are stored on the client device. If so, the client device again attempts to connect to the cluster at the new generic IP address via step 156. If no additional generic IP addresses are available, then the connection attempts are ended, and a notice of the failure is provided to the user.

Once a communication connection is established between the client device and the cluster via the Internet, the client device makes a request to participate in the selected game type at a step 162. If the IP address of the node in the cluster to which the client device has connected is not the node hosting the game instance currently designated as the intake for the selected game type (sometimes referred to as the intake node), the client device will receive the correct IP address for the node in the cluster that is hosting the game instance designated as the intake for the selected game. At a decision step 164, the client device determines whether it has been given a different IP address for redirecting the client device to the correct node currently designated as the intake for the requested game. If the client device receives a new IP address, the client device redirects connection with the client to the new intake address at a step 166. The client device then monitors the communication to detect any failure at a decision step 168. If the communication connection fails at this point, then the client device again attempts to establish communication with one of the IP addresses associated with the DNS name for the selected game at step 150. If, however, the client device successfully connects to the new intake IP address, the client device again requests game service at step 162.

As long as the client device is not redirected again because the intake moved before the client device's game request was received, the client device has connected to the current intake for the selected type of game and will not be redirected at decision step 164. The client device then waits at a step 170 for a match to be made with other client devices requesting the same selected game. If, while waiting for a match, communication is disconnected between the client device and the intake, the client device detects the disconnection at a decision step 172. If communication is disconnected, the client device receives the most recent intake address for the selected game and a disconnection notice from the cluster at a step 174. If no interruption occurs in the communication, and sufficient other client devices are connected to the intake for the selected game, a match is formed by that intake and the selected game is played at a step 176.

While the game is being played, at a decision step 178, the client device monitors the communications to detect any interruption in the game service or in the communication with the cluster. If communication is disconnected, the service fails, or the game finishes, then the client device receives the IP address for the current intake and a disconnect notice from the cluster at a step 180. At a step 182, the client device then displays a notice to the user indicating that the game has terminated and requesting whether the user wishes to play the game again. If so, the client device attempts to connect to the new IP address at step 166. If the user does not wish to play another game, the process ends.

The user may also terminate the game while connected to the cluster. The client device detects an indication that the user wishes to exit the game at a decision step 184. If the user has elected to exit, the process ends. However, if the user does not indicate any desire to end the game, the game continues for as long as the same group of matched client players continues to play the game at step 186 and an interruption in communications does not occur. If the group of matched client players disbands, but the user wishes to continue playing the same game type, then the client device is directed to the current intake for the selected type of game in order to be rematched into a new game. The client device requests to be disconnected from the current game service at a step 190, which enables the client device to receive the IP address for the current intake of the selected game type at step 174. Reconnection to the current intake then proceeds as described above.

Figure 4:
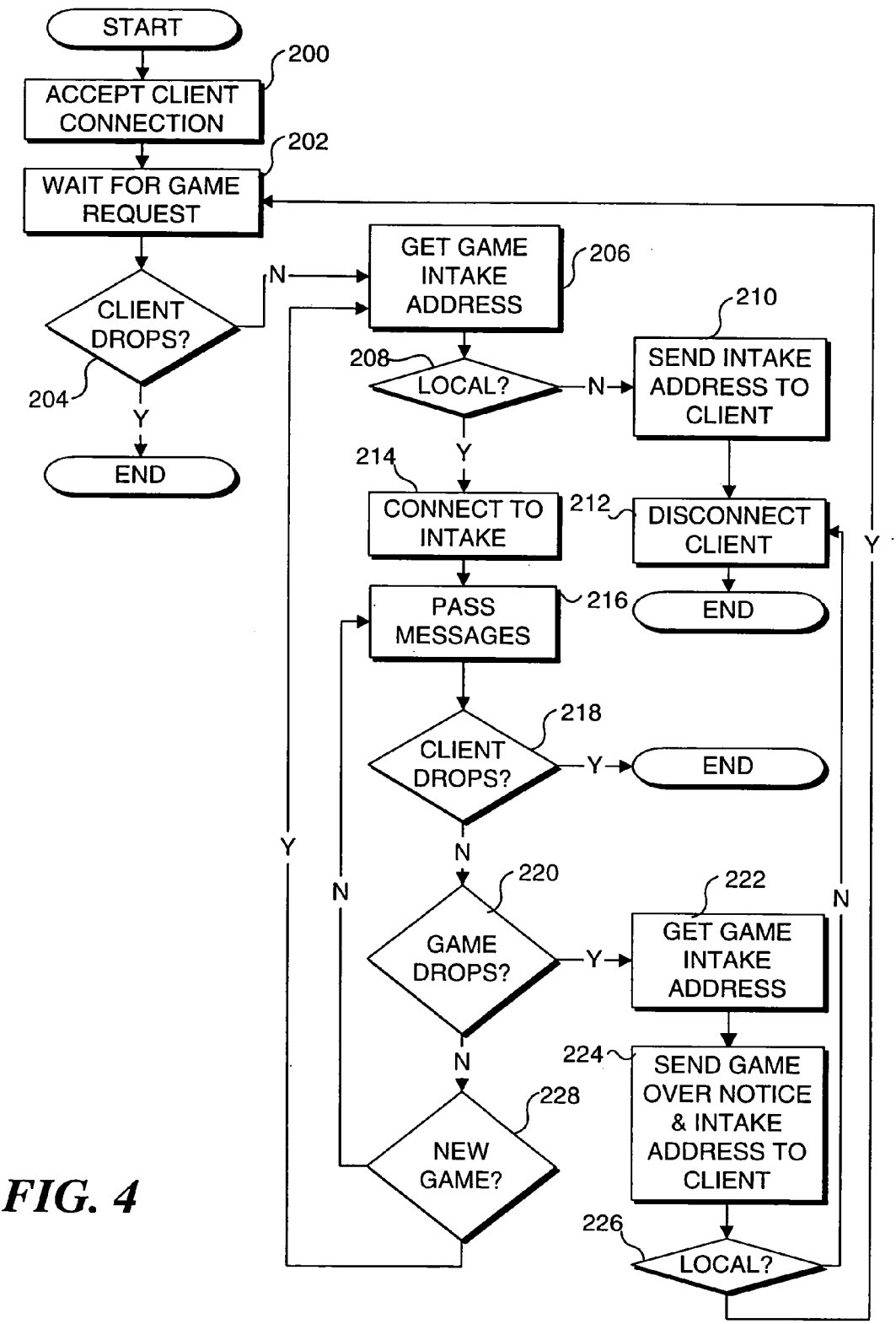
FIG. 4 illustrates the logic of one preferred embodiment for providing a proxy service to manage client connections to a node in the cluster.

On the cluster side of this process, FIG. 4 illustrates the logic implemented by a proxy service in a preferred embodiment, to manage client connections with a node in the cluster. At a step 200, the proxy service accepts an initial TCP connection from a client. The proxy service then waits for a game request from the client at a step 202. At a decision step 204 the proxy service determines whether the client connection has been dropped. If so, the service to that client comes to an end.

However, if the proxy service successfully receives a game request without the connection being dropped, then at a step 206, the proxy service requests an address of the intake for the requested game type. The proxy service makes this request to the load balancer component of the proxy service on the local node executing the proxy service. When the proxy service receives an intake address from the load balancer, at a decision step 208, the proxy service determines whether the intake address is on the local node (i.e., the node on which the proxy service is executing) or on a remote node. If the intake address is not on the local node, then the proxy service sends a message to the client at a step 210, including the IP address of the node with the intake for the requested game type. The proxy service then disconnects from the client at a step 212, ending its service to this client.

Once the client connects to the node with the intake for the requested game type, the local proxy service of that node establishes a TCP connection to the intake at a step 214. The intake matches the client with other waiting clients for an instance of the requested game. This function is considered a stateful connection, because the same game service continues to service this group of clients who are playing in a game instance, until the game is completed, the game is prematurely terminated, or the connection is interrupted. Thus, at a step 216, the proxy service passes messages between the same game service and the client throughout the game session for that client. While the game session continues, the proxy service determines whether the client has dropped out of the session at a decision step 218. If so, the service to that client is terminated.

While the client remains in the game session, the proxy service also determines whether the game session has been prematurely dropped at a decision step 220. A game session may be dropped if another client drops out of the game and the game instance does not permit an artificial intelligence game player (i.e., the computer) to take over. The game session may also be dropped if the game session fails, the node is removed from the cluster, or if other interruptions occur.

If a game interruption occurs, the proxy service again requests the load balancer for the current intake address of the selected game type at a step 222. When the proxy service receives the intake address from the load balancer, the proxy service sends a message to the client at a step 224, notifying the client that the game is over, and providing the client with the current intake address. At a decision step 226, the proxy service determines whether the current intake address corresponds to a local game service (i.e., on the same node as the proxy service). If the current intake for the selected game is on the local node, the proxy service returns to step 202 to wait for the client to request another game. However, if the current intake for the selected game is on a remote node, the proxy service disconnects the client at a step 212, requiring the client to reconnect to the node designated as the current intake for the game selected by the client.

While the game is in session, the proxy service monitors to determine if the client has requested a new instance of the same type of game at a decision step 228. So long as no such request is made, the proxy service continues to relay messages between the client and the game service, as indicated at a step 216. If, however, the client requests a new game instance of the same game type, the proxy service returns to step 206 to obtain the address for the current intake for the selected game type. The process then continues as before.

Figure 5A:
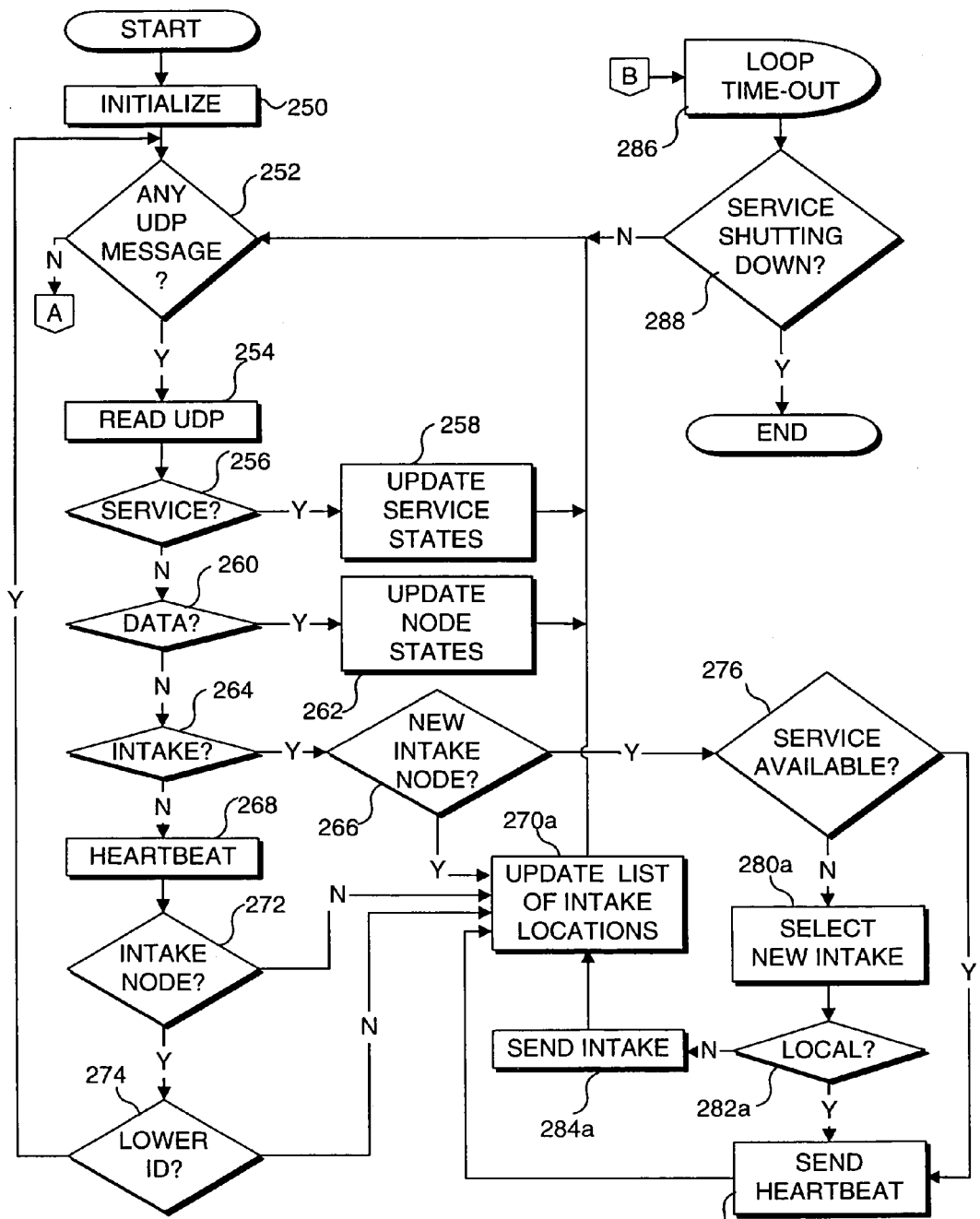
FIG. 5A illustrates a portion of the load-balancing logic employed on each node in the cluster for handling User Datagram Protocol (UDP) messages.

FIG. 5A illustrates the load-balancing logic that occurs on each node in the cluster. Load balancing is initialized at a step 250. At a decision step 252, the load balancer detects any UDP messages from the game services on that node, or from other load balancers on other nodes in the cluster. While there are no incoming UDP messages, the load balancer passes control at a continuation step A to perform the steps illustrated in FIG. 5B (discussed later). When the load balancer detects a new UDP message, the load balancer reads the UDP message at a step 254.

The load balancer then determines which type of UDP message it has received. In a preferred embodiment, there are four types of UDP messages. One type of UDP message is a "service" message from each game service on the node. Approximately every two seconds, each game service transmits a service message to the load balancer to inform the load balancer of the status of the game service. Preferably, each service message includes a unique name or ID for the game service that is transmitting the service message, the IP address, the TCP port of the game service, the current population of clients being served by the game service, and an indication of whether the game service will accept additional clients. Each game service may accommodate clients for a single game or clients for multiple games. It would not be unusual to handle more than 1,000 clients per game service. The load balancer maintains a table that includes the state information described above for each game service. Thus, if the load balancer determines at a decision step 256 that the incoming UDP message is a service message, the load balancer updates its table of service states at a step 258. Updating the table includes adding a new game service from the table if a service message is received from a newly started game service.

Another type of UDP message is a "data" message that is received from the other nodes in the cluster. Each data message includes information such as a unique node ID, the node IP address, the total load on a node, a list of all game services running on that node, and an indication of whether the node is accepting new client connections. Preferably, each node sends a data message to the other nodes in the cluster approximately every two seconds in this embodiment. If a data message is not received from a remote node in the cluster within approximately eight seconds, in this example, the remote node is assumed to have failed. In a manner similar to the table of service states, each load balancer maintains a table of node states, including the information described above, for all nodes in the cluster. Thus, if the load balancer for a node determines at a decision step 260 that the UDP message is a data message, the load balancer for the node updates its table of node states at a step 262. Updating includes adding previously unknown nodes that have recently been activated on the cluster.

Another type of UDP message is an "intake" message, which is received from a remote node in the cluster. An intake message indicates that the remote node in the cluster has decided that the intake for a particular game type should be assigned to a node other than the remote node. The intake message includes identification (e.g., the node IP address and game service TCP port) of the node and of the particular game service that the remote node has determined to designate as the intake for the particular game type. Thus, at a decision step 264, the load balancer on a node determines whether a UDP message is an intake message, and if so, further determines at a decision step 266 whether the node has been selected to take over the intake for a given game type.

The fourth kind of UDP message in this exemplary preferred embodiment is a "heartbeat" or status message from a node that currently is designated as an intake for any one of the game types. If none of the other three types of UDP messages are detected, the load balancer assumes that the UDP message is a heartbeat or status message at a step 268. A heartbeat or status message includes information such as the game ID, node IP address, and game service TCP port. Receipt of successive heartbeat or status messages assures all other nodes that the intake for a game type is still functioning. Preferably, a heartbeat or status message is received approximately four times per second for each game type in this embodiment. If a heartbeat message is not received within approximately one second, then one of the prospective receiving nodes assumes that the intake has failed for that game type and assumes control of the intake for that game type. Thus, when a node receives a heartbeat message, the load balancer for that node must determine at a decision step 272 whether the node already has control of the intake for the game type reflected in the heartbeat message. If both the heartbeat message received from another node and the load balancer of the local node indicate that both the other node and the local node control the intake for a particular game type, then the conflict is resolved at a decision step 274. Resolution of the conflict occurs by providing that the node with the lowest ID number will control the intake for a game type. If there was no conflict, or if the local node relinquishes control of the intake designation after resolution of a conflict, then the load balancer updates a table of intake locations at a step 270a.

If a local node determines at decision step 266 that a remote node sent an intake message designating a particular game service on the local node as the new intake for a game type, then the local node load balancer determines at a decision step 276 whether the designated game service is still available. If so, the designated game service assumes control as the intake and sends a heartbeat message at a step 278a. If the designated game service is unavailable, the load balancer selects a new game service to be the new intake for that game type at a step 280a. If the new intake game service resides on the local node, as determined at a decision step 282a, then the new intake game service becomes the intake and sends a heartbeat message at step 278a. If, however, the game service newly selected as the intake resides on a remote node in the cluster, then the load balancer broadcasts an intake message to the other nodes at a step 284a. The local node then updates its table of intake locations at a step 270a. Finally, the local node waits for another UDP message at decision step 252.

Figure 5B:
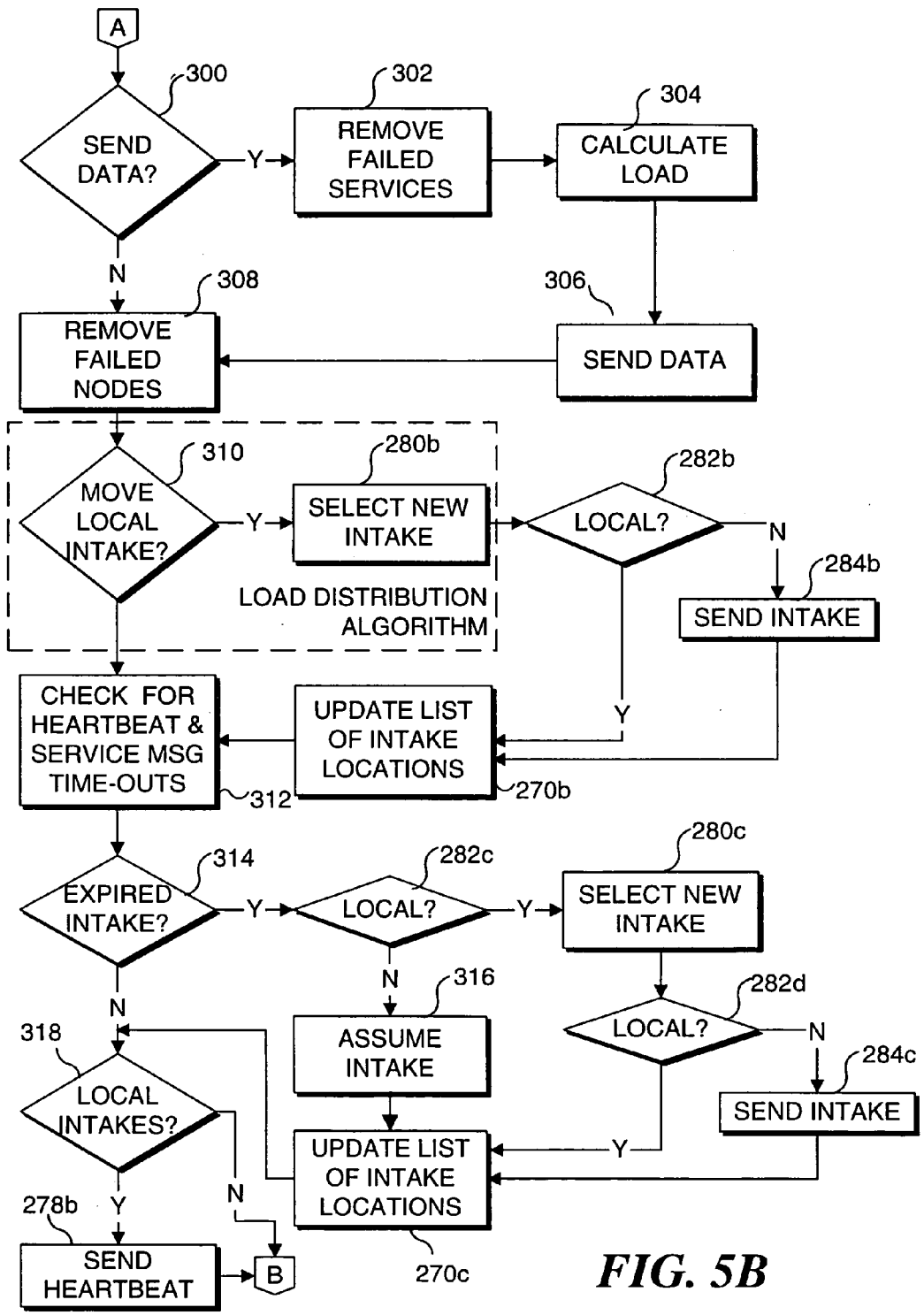
FIG. 5B illustrates a portion of the load-balancing logic employed on each node in the cluster for handling load distribution and fault tolerance.

Continuation point B indicates the transfer of control from the logical steps illustrated in FIG. 5B to a step 286, where the load balancing process waits for a loop time-out before going forward to loop again through the steps of FIGS. 5A and 5B. This pause exists to throttle the load-balancer's use of the processor so as not to starve the other services running on the machine. When this time-out finishes, the process proceeds to a decision step 288, where the load balancer determines whether the load balancer service is to shut down. If so, the load-balancing process ends. If not the load balancer continues to monitor the subnet for incoming UDP messages at a decision step 252.

FIG. 5B illustrates the steps performed while no UDP messages are incoming. Continuation point A indicates that control is passed from the corresponding point in the logic illustrated in FIG. 5A to a decision step 300, where the load balancer determines whether it is time to send an updated data message to the rest of the nodes in the cluster. If so, the load balancer first updates its list of local game services at a step 302 by removing any game services from its list that failed to send a service message to the load balancer within the allocated time. For example, if a service message is not received from a particular game service within six seconds, the node assumes the game service has failed, and the failed game service is removed from the load balancer's service list.

The load balancer calculates the load on the node at a step 304. Preferably, this load calculation is accomplished via a script function that can be dynamically changed while the node is running, to adjust the behavior of the load balancer. In computing a "load value" for the node, the load calculation script uses information such as the node's available memory size, CPU utilization, the total number of clients being serviced on the node, a preset target population of clients, and a preset maximum population of clients. Use of preset, but adjustable parameters enable network administrators to tune each node. Preferably, the load value is also normalized to a range from 0–1000. In this manner, all nodes in the cluster can be compared uniformly even if each node in the cluster has different processing capabilities. The load balancer then assembles a data message and broadcasts the data message to other nodes in the cluster at a step 306. At a step 308, the load balancer removes any node information from its table of node information related to any node that failed to send a data message within the allocated time.

The load balancer performs its load-distribution algorithm to determine whether an intake should be moved from the node to another node, and if so, selects the game service on a remote node that should be designated as the new intake for a game type. At a decision step 310, the load balancer first determines whether to move an intake to another node. To make this determination, the node's load balancer performs another script function. A variety of criteria can be employed in the function used to make the decision. For example, the function may simply be a timer, causing the intake to move at predetermined intervals. Preferably, however, the function uses parameters such as the current client population of the intake game service, the length of time the intake has been situated at that game service, whether the local node has any special affinity for the game type, and the previously computed load value for the node. The function can also use information about the condition of other game instances and other nodes to determine whether the game instance that is currently designated as the intake should give up that designation in favor of another game instance. For example, the function could consider the calculated load on other nodes, or the current client population of other instances of the same game type on other nodes, or on the same node as the current intake. Preferably, however, the function considers only the condition of the current intake, so as not to move the intake around so often that the frequent change of game instances designated as the intake slows the formation and processing of games.

Nevertheless, the script can be modified at any time to provide flexibility to a cluster administrator. Both the logic and threshold values that contribute to the decision can be dynamicly configured independently on each node. For example, a cluster administrator could configure the maximum client population allowed per game service, the maximum time allowed for a game service to be designated as the intake, the maximum load value allowed for a node, and the minimum time allowed between intake moves to control the redesignation of the intake and thus, to balance the processing load as desired.

If the load balancer determines that it is inappropriate to move an intake at the present time, the load balancer moves on to a step 312 to check for time-out of heartbeat messages and service messages. If, however, the load balancer determines that the game instance designated as the intake should now be changed, the load balancer performs a third script function at a step 280b to calculate a "rating value" for each instance of the game service of the applicable game type on each node in the cluster. This function also uses parameters such as the client population of each game service for the applicable game type and the load value of each node. In addition, the function may also include an affinity parameter that gives higher weight to a node configured so as to be given preference for a particular game type. The game service with the highest rating value in the cluster is then selected to be the new intake for the game type.

If the newly selected intake for a game service resides on the same node as the previous intake for the game service, then at a decision step 282b the load balancer determines whether the load balancer need only update its own table of intake locations at a step 270b. However, if the newly selected intake for the game service is at a remote node, the load balancer broadcasts an intake message to all of the nodes in the cluster at a step 284b. After the intake message is sent, the load balancer then updates its table of intake locations at step 270b.

The load balancer then checks for time-outs of any heartbeat (status) or service messages at a step 312. This check is to determine whether any intake game services have failed to issue the expected heartbeat or service message within the allocated time. Determination of whether an intake game service has expired is made at a decision step 314. If the load balancer has not received an expected heartbeat or service message within the allocated time, then at a decision step 282c, the load balancer determines whether the expected intake game service resides on the local node. If the expected intake for a game service does reside on the local node, the load balancer assumes that the expected intake game service has failed and selects a new intake game service at a step 280c, as described above. At a decision step 282d, the load balancer determines whether the newly selected intake game service also resides on the local node. If so, the load balancer updates its table of intake locations at a step 270c. If, however, the newly selected intake game service resides on a remote node, then the load balancer broadcasts an intake message to all nodes in the cluster at a step 284c. The load balancer then updates its list of intake locations at step 270c.

If decision step 282c determines that the expected intake for a game service does not reside on the local node, the load balancer assumes that the other node has failed and assumes control of the intake for that game type at a step 316. As part of this step, the load balancer also selects a game service on the local node to be the intake game service based on the ratings for the local game services. The load balancer then updates its table of intake loactions at step 270c. As suggested, although the selection and update of a newly selected intake game service is the same as described earlier with regard to the load-distribution algorithm, the selection and update at steps 280c and 316 are a result of a failure rather than the result of a decision to better distribute the load. Thus, the selection and update at these points are a function of a fault tolerance that is built into the load balancer. This fault tolerance is also reflected in FIG. 5A, beginning at decision step 276.

Once a new intake game service is selected or if all expected heartbeat and service messages are received in the allocated time, at a decision step 318, the load balancer determines whether any intake game services reside on the local node. If so, then the load balancer broadcasts a heartbeat at a step 278b, and proceeds to continuation point B. Similarly, if no intake game services reside on the local node, the load balancer proceeds to continution point B.

Although the present invention has been described in connection with the preferred form of practicing it, those of ordinary skill in the art will understand that many modifications can be made thereto within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method of distributing a processing load in a cluster having a plurality of resources, comprising the steps of:
    (a) designating a first resource as an intake providing a specific type of service for a first session;
    (b) directing a plurality of new client requests for the specific type of service by the cluster to the intake to form a first group of clients, wherein each client in the first group continues to receive the specific type of service only from the first resource for as long as the specific type of service is provided;
    (c) determining that a second resource be designated as a new intake, to balance the processing load among the plurality of resources;
    (d) designating the second resource as the new intake and providing an intake message from the first resource to the plurality of resources in the cluster identifying the second resource as the new intake, wherein the new intake is a single entry-point service resource in the cluster; and
    (e) directing successive new client requests for services by the cluster to the new intake to form a second group of clients, wherein each client in the second group continues to receive services only from the second resource for as long as those services are provided.

2. The method of claim 1, wherein the step of designating a first resource as an intake comprises the steps of:
    (a) assigning a unique identifier to each resource in the cluster; and
    (b) selecting the resource that will be designated as a function of its identifier.

3. The method of claim 1, wherein the step of designating a first resource as an intake comprises the steps of:
    (a) calculating a rating value for each resource in the cluster; and
    (b) selecting the resource that will be designated as a function of the rating value.

4. The method of claim 1, wherein the step of designating a first resource as an intake comprises the steps of:
    (a) calculating a time-out; and
    (b) selecting the resource that will be designated as a function of the time-out.

5. The method of claim 1, wherein the step of directing the plurality of new client requests for service to the intake to form the first group of clients comprises the steps of:
    (a) receiving a request for service from a new client, wherein the request is received by a resource other than the intake; and
    (b) directing the client to the intake.

6. The method of claim 1, wherein the step of directing the plurality of new client requests for service to the intake to form a first group of clients comprises the steps of:
    (a) receiving a request for service from a new client, wherein the request is received by a resource other than the intake; and
    (b) transferring the request for service by the new client to the intake.

7. The method of claim 1, further comprising the steps of:
    (a) detecting a termination in a service being provided to a client by one of the plurality of resources;
    (b) determining that the client is requesting a service from the cluster; and
    (c) directing the client to a current intake for the service requested by the client.

8. The method of claim 1, wherein the step of determining that the second resource be designated comprises the steps of:
    (a) calculating a load value of the first resource;
    (b) comparing the load value to a threshold value; and
    (c) designating the second resource as the new intake, if the load value exceeds the threshold value.

9. The method of claim 1, wherein the step of designating the second resource as the new intake comprises the steps of:
    (a) calculating a rating value for each resource in the cluster; and
    (b) selecting the resource that will be designated as a function of the rating value.

10. The method of claim 1, further comprising the step of periodically exchanging status messages between the plurality of resources, wherein the step of determining that the second resource be designated occurs if a status message has not been received from the intake within a predetermined period of time.

11. The method of claim 10, wherein the step of designating the second resource as the new intake comprises the step of the second resource assuming the designation as the new intake after the second resource fails to receive the status message from the first resource within the predetermined period of time, said status message identifying the first resource as the intake.

12. The method of claim 1, wherein the step of designating the second resource as the new intake comprises the steps of:
    (a) receiving the intake message at the plurality of resources in the cluster, including the second resource; and
    (b) updating a list at each of the plurality of resources in the cluster, said list indicating that the second resource has been designated as the new intake.

13. The method of claim 12, further comprising the step of providing a message from the second resource to the plurality of resources in the cluster identifying the second resource as the new intake to confirm that the second resource has accepted its designation as the new intake and to ensure that the plurality of resources are aware of the new intake.

14. The method of claim 1, wherein the cluster comprises a plurality of nodes on which the plurality of resources are implemented, and wherein the step of designating the second resource as the new intake comprises the steps of:
    (a) determining that the second resource and the first resource reside on a common node;
    (b) updating a list stored on the common node, said list indicating that the second resource is designated as the intake; and
    (c) providing a message from the second resource designating the second resource as the intake.

15. The method of claim 1, further comprising the step of the first resource providing a data message to the plurality of resources in the cluster, said data message including an identification of the first resource and a load value of the first resource.

16. The method of claim 1, further comprising the following steps that are carried out by a client:
    (a) storing a network address for one resource in the cluster;
    (b) automatically attempting to connect to said one resource at the network address;
    (c) receiving from the cluster a network address for the intake for a service requested by the client; and
    (d) automatically attempting to connect to the network address for the intake.

17. A machine readable medium having machine-executable instructions for performing the steps of claim 1.

18. A machine readable medium having machine-executable instructions for performing the steps of claim 16.

19. A system for distributing a processing load in a cluster, comprising:
    (a) at least one processor for implementing the cluster, said at least one processor comprising a plurality of resources that provide services to a plurality of clients;
    (b) an interface for coupling said at least one processor to the plurality of clients;
    (c) a memory in which a plurality of machine instructions are stored; and
    (d) said machine instructions, when executed by said at least one processor implementing:
        (i) a first resource operatively connected to the plurality of clients, said first resource being designated as an intake that accepts requests from new clients for a service, and in response thereto, forms a first group of clients that continue to receive services only from the first resource for as long as those services are provided and are needed;
        (ii) said first resource determining to designate a second resource from among the plurality of resources as a new intake, the second resource being connected in communication with the first resource;
        (iii) designating the second resource as the new intake to accept successive new client requests for service, forming a second group of clients that continue to receive services from the second resource for as long as those services are provided and are needed; and
        (iv) providing an intake message from the first resource to the plurality of resources in the cluster identifying the second resource as the new intake, wherein the new intake is a single entry-point service resource in the cluster.

20. The system of claim 19, wherein the machine instructions further cause a new client request for service to be directed to a resource currently designated as the intake.

21. The system of claim 19, wherein the machine instructions are executed in a plurality of instances by a plurality of processors.

22. The system of claim 19, wherein a first instance of the machine instructions for load balancing are executed to manage the first resource and a second instance of the machine instructions for load balancing are executed to manage the second resource, said machine instructions causing said first instance to communicate with said second instance, and wherein said first instance of the machine instructions cause the first resource to transfer the intake designation to the second resource.

23. The system of claim 19, further comprising a client device having a client processor and a client memory in which are stored:
    (a) machine instructions; and
    (b) a list that includes at least one network address corresponding to at least one resource in the cluster, said machine instructions stored in the client memory causing the client processor to:
        (i) automatically attempt to connect to said at least one resource using the network address corresponding thereto;
        (ii) receive from the cluster an intake network address corresponding to a resource designated as the intake for said at least one service; and
        (iii) automatically attempt to connect to the intake network address.

24. A method of distributing a processing load among a cluster of nodes, each node providing at least one of a plurality of different types of services, comprising the steps of:
    (a) designating a first instance of a first type of service on a first node as an intake;
    (b) directing new client requests for said first type of service to the intake to form a first group of clients, wherein each client in the first group continues to receive services only from the first instance on the first node for as long as those services are provided and are needed;

(c) determining that a second instance of the first type of service be designated as a new intake for the first type of service;

(d) designating the second instance as the new intake for the first type of service and providing an intake message from the first node designated as the intake for the first instance to the nodes in the cluster identifying the second instance designated as the new intake for the first type of service, wherein the new intake is a single entry-point service resource in the cluster; and (e) directing a plurality of successive new client requests for the first type of service to the new intake to form a second group of clients, wherein each client in the second group continues to receive services only from the second instance for as long as those services are provided and are needed.

25. The method of claim 24, wherein the step of directing new client requests for said first type of service to the intake to form a first group of clients comprises the steps of:

(a) receiving from a new client a request for said first type of service, wherein the request is received at a node other than the node on which the intake is designated; and (b) directing the client to the intake.

26. The method of claim 24, wherein the step of directing a plurality of new client requests for service to the intake to form a first group of clients comprises the steps of:

(a) receiving from a new client a request for said first type of service, wherein the request is received at a node other than the node on which the intake is designated; and (b) transferring the request for service by the new client to the intake.

27. The method of claim 24, wherein the step of determining to designate a second instance as the new intake comprises the steps of:

(a) calculating a load value for the first node, said load value being normalized to enable a uniform comparison to corresponding load values for the other nodes of the cluster;

(b) comparing the load value for the first node with a threshold value; and (c) designating the second instance as the new intake, if the load value exceeds the threshold value.

28. The method of claim 24, wherein the step of designating the second instance as the new intake for the first type of service comprises the steps of:

(a) calculating a rating value for each resource in the cluster; and (b) selecting the resource that will be designated as a function of the rating value.

29. The method of claim 24, further comprising the step of periodically exchanging status messages between the plurality of nodes, wherein the step of determining that the second resource be designated occurs if a status message has not been received from the intake within a predetermined period of time.

30. The method of claim 29, wherein the step of designating the second instance as the new intake for the first type of service comprises the steps of a second node assuming authority to designate the second instance as the new intake; and automatically selecting the second instance as the new intake from a plurality of instances of the first type of service on the second node after the second node fails to receive the status message from the first instance within a predetermined period of time, said status message identifying the first service instance as the intake.

31. The method of claim 24, wherein the step of designating the second instance as the new intake for the first type of service comprises the steps of:

(a) receiving the intake message at the nodes in the cluster, including a second node on which the second instance is executing; and (b) updating a list at the nodes in the cluster, said list indicating that the second instance has been designated as the new intake.

32. The method of claim 31, further comprising the step of providing a message from the second node to the nodes in the cluster, said message identifying the second instance as the new intake to confirm that the second instance has accepted its designation as the new intake and to ensure that the plurality of nodes are aware of the new intake.

33. The method of claim 24, wherein the step of designating the second instance as the new intake comprises the steps of:

(a) determining that the second instance and the first instance reside on a common node;

(b) updating a list stored on the common node, said list indicating that the second instance is designated as the new intake; and (c) providing a message from the common node to the nodes in the cluster, said message identifying the second instance as the new intake.

34. The method of claim 24, further comprising the step of providing a data message from the first node to the plurality of nodes in the cluster, said data message including an identification of the first instance and a load value of the first node.

35. The method of claim 24, further comprising the step of sending a service message from the first instance to a control process executing on the first node, said service message including a unique identification of the first instance and operational status parameters of the first instance that the control process uses to calculate a rating value for the first instance and a load value for the node that are used to determine a future intake designation.

36. A system for distributing a processing load in a cluster of resources, comprising:

(a) means for enabling communication between the resources comprising the cluster;

(b) means for enabling communication between the resources comprising the cluster and a plurality of clients requesting services from said resources;

(c) means for designating a first resource as an intake so that the first resource accepts requests from new clients for a service, and in response thereto, forms a first group of clients that continue to receive the service only from the first resource for as long as the service is provided and needed;

(d) means for determining to designate a second resource as a new intake;

(e) means for designating a second resource as the new intake so that the second resource begins to accept requests from new clients for the service, and in response thereto, forms a second group of clients that continue to receive the service only from the second resource for as long as the service is provided; and (f) providing an intake message from the first resource to the plurality of resources in the cluster identifying the second resource as the intake, wherein the intake is a single entry-point service resource in the cluster.

* * * * *